(12) United States Patent
Turnbull et al.

(10) Patent No.: US 8,218,443 B2
(45) Date of Patent: Jul. 10, 2012

(54) CONTROLLING BANDWIDTH SHARE

(75) Inventors: Rory S Turnbull, Woodbridge (GB); Michael E Nilsson, Ipswich (GB); Stephen C Appleby, Wivenhoe (GB); Ian B Crabtree, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 13/201,268

(22) PCT Filed: Feb. 2, 2010

(86) PCT No.: PCT/GB2010/000166
§ 371 (c)(1),
(2), (4) Date: Aug. 12, 2011

(87) PCT Pub. No.: WO2010/092324
PCT Pub. Date: Aug. 19, 2010

(65) Prior Publication Data
US 2011/0292801 A1    Dec. 1, 2011

(30) Foreign Application Priority Data

Feb. 12, 2009  (EP) .................................... 09250358
Nov. 5, 2009   (GB) .................................. 0919441.6

(51) Int. Cl.
*G01R 31/08*   (2006.01)
(52) U.S. Cl. ..................................................... 370/235
(58) Field of Classification Search ........... 370/235–240
See application file for complete search history.

(56) References Cited

U.S. PATENT DOCUMENTS

| 7,319,673 | B1 * | 1/2008 | Briscoe et al. | 370/252 |
| 2005/0286488 | A1 * | 12/2005 | Briscoe et al. | 370/351 |
| 2006/0092836 | A1 | 5/2006 | Kwan et al. | |
| 2008/0225728 | A1 * | 9/2008 | Plamondon | 370/237 |
| 2008/0304413 | A1 | 12/2008 | Briscoe et al. | |

OTHER PUBLICATIONS

International Search Report and Written Opinion of the International Searching Authority (11 pgs.) dated Nov. 8, 2010 issued in PCT/GB2010/000163.
Ramakrishnan, TeraOptic Networks; S. Floyd, ACIRI; D. Black, EMC; "The Addition of Explicit Congestion Notification (ECN) to IP", IETF Standard, Internet Engineering Task Force, Sep. 1, 2001.

(Continued)

*Primary Examiner* — Kwang B Yao
*Assistant Examiner* — Tung Q Tran
(74) *Attorney, Agent, or Firm* — Nixon & Vanderhye P.C.

(57) ABSTRACT

There is proposed a modification to the ECN protocol to remove the one-to-one relationship between the network signalling congestion and the sender response to that congestion. The result is to allow a receiver terminal to exhibit some control of bandwidth share relative to other receiver terminals. The idea is to calculate the average CE arrival frequency from received data packets and to set ECE flags at a rate determined as a function of the average CE arrival frequency. Preferably, the function is a multiplier applied to the average CE arrival frequency. The effect of averaging the CE arrival frequency as well as application of a multiplier is a decoupling of the ECE marked ACKs sent by a receiver to the sender, and control of the resulting transmission rate at the sender.

10 Claims, 7 Drawing Sheets

OTHER PUBLICATIONS

Spring, D. et al., "Robust Explicit Congestion Notification (ECN) Signaling with Nonces", Ely University of Washington N., (Jun. 1, 2003), pp. 1-3.

Ely, D. et al., "Robust Congestion Signaling", International Conference on Network Protocols 2001 Institute of Electrical and Electronics Engineers Computer Society US, [Online] (Nov. 11, 2001), pp. 332-341.

Spring, N. et al., "Robust Explicit Congestion Notification (ECN) Signaling with Nonces", University of Washington N., (Jun. 1, 2003), pp. 1-12.

International Search Report for PCT/GB2010/000166 mailed Nov. 5, 2010.

Eli, D. et al., "Robust Congestion Signaling", International Conference On Network Protocols 2001 Institute of Electrical and Electronics Engineers Computer Society US, [Online] (Nov. 11, 2001), pp. 332-341.

Spring, D. et al,, "Robust Explicit Congestion Notification (ECN) Signaling with Nonces", Ely University of Washington N., (Jun. 1, 2003) pp. 1-3.

\* cited by examiner

CONTROLLING BANDWIDTH SHARE

This application is the U.S. national phase of International Application No. PCT/GB2010/000166 filed 2 Feb. 2010, which designated the U.S. and claims priority to EP Application No. 09250358.0 filed 12 Feb. 2009; and GB Application No. 0919441.6 filed 5 Nov. 2009, the entire contents of each of which are hereby incorporated by reference.

FIELD OF THE INVENTION

This invention relates to a method for handling a data flow at a receiver, in particular a method for managing and responding to received data packets to give a certain level of control over the transmission rate of the data packets in the flow.

BACKGROUND TO THE INVENTION

For some IP applications such as IPTV it is often considered beneficial to introduce some guarantee on bandwidth availability, normally through the use of some form of bandwidth reservation. These schemes offer some advantages, but they are often expensive to deploy, and require a special technical and commercial relationship between the content and network providers. Usually, this means that to be a provider of IPTV it also necessary to be an ISP. In addition, the required admission control imposes a hard limit on the number of simultaneous streams which can lead to session refusals.

The encoding of video ideally requires a bit stream that varies in bandwidth. This enables complex portions of video (e.g. high spatial detail, high movement) to be encoded with more bits than simpler portions (e.g. talking head). Video encoded in this way is perceived as constant quality, but it requires a variable bit rate (VBR) transport. Most IPTV systems in place today (e.g. BT Vision) rely on the reservation of fixed portions of network bandwidth and use constant bit rate CBR video to match the reserved portion of bandwidth. Whilst simple to understand and to dimension such a system, it does not deliver a constant quality experience and importantly does not make the most effective use of the total available bandwidth.

It has been demonstrated by using constant quality video encoding (with a VBR) it is possible to double the number of simultaneous streams over the same network compared with using CBR encoding with the same perceived quality. However, there has been little work in exploring what mechanisms could actually be used to apportion the bandwidth in a channel to allow each stream in the channel to have constant quality video encoding.

Indeed, in applications that run over the Internet, the mechanisms in place in the IP protocol, and more specifically TCP/IP, tend to result in streams receiving the same bandwidth allocation. As already stated, this is not desirable, and instead it is preferred that each stream can be adapted to receive a bandwidth share that is proportional to the requirement relative to other streams in order to maintain a constant quality video stream.

In TCP/IP, the existing congestion avoidance techniques (such as those based on congestion window management) respond to network congestion by reducing the transmission rate. All TCP flows across the same portion of a congested network will respond in a similar fashion resulting in each flow getting a roughly equal share of the available bandwidth.

Explicit Congestion Notification (ECN) is protocol for signalling impending congestion in IP networks by marking packets rather than dropping them. Used with TCP it enables a sender to be informed of congestion so that it can reduce its transmission rate in an attempt to avoid impending congestion. As packets are not dropped, there is no need for packet re-transmission and network utility is improved. ECN uses 2 bits in the IP header, and in the case of ECN capable TCP a further 2 bits in the TCP header of a data packet to be transmitted.

A router equipped with active queue management, such as Random Early Detection (RED), marks IP headers with appropriate flags to signal congestion to the endpoints prior to the router's buffer overflowing and thus consequential packet loss. Under ideal conditions, there is little need for retransmissions, which gives rise to an improved overall throughput.

The IP header markings are detected at the receiver and are propagated up the stack to the transport protocol layer. In the case of TCP, further packet markings in the TCP header enable the receiver to signal to the sender that the network is becoming congested and that the sender should reduce the congestion window pre-emptively as if a packet loss had occurred.

FIG. 1 shows the IPv4 Type Of Service (TOS) octet 100, where bits 6 and 7 are designated as the ECN field 104. Specifically, the first 6 bits represent the differentiated services codepoint (DSCP) field 102, and the 2 following bits the ECN field 104, which can be set as follows:

0 0=Not ECN
0 1=ECN Capable Transport, ECT(1)
1 0=ECN Capable Transport, ECT(0)
1 1=CE Congestion Experienced FIG. 2 shows bytes 13 and 14 of a TCP header 200. Field 206 is for the congestion window reduced (CWR) flag and field 208 is for the ECN echo flag (ECE). The ECE flag is set by a receiver to signal to a sender that it has observed congestion (i.e. it has seen a CE flag in a received packet), while the CWR flag allows a sender to signal to a receiver that it has responded to congestion by reducing its congestion window. Typically these flags are set to "1" for flag active, and "0" for flag inactive.

In operation, each data packet is transmitted by a sender to a receiver with the ECN field 104 in the IP header set with codepoints "0 1" or "1 0" to signal ECN capable transport (i.e. the end points in this connection support ECN). If an intermediate router through which the data packets are routed is not experiencing congestion, then the data packets are simply forwarded to the receiver. The receiver responds by sending an acknowledgement packet ACK, with the ECT codepoints also set in the ACK data packet. The ACK data packet is received by the router and forwarded onto the sender.

Under ECN, if the router starts experiencing congestion, for example when the router's buffer is filled beyond a particular threshold, then the router will start marking data packets received from the sender with the congestion experienced flag in the ECN field of the IP header (codepoint=1 1) before forwarding onto the receiver. The receiver acknowledges successful receipt of the data packet by sending an acknowledgement packet ACK, with the ECT codepoint set in the IP header, as well as ECE flag in the TCP header. The ECE (ECN-Echo) flag is used to notify the sender that a router via which a previous packet was sent is experiencing congestion and had signalled as such using ECN. The ACK packet is received by the router and forwarded onto the sender. The receiver will continue marking all subsequent ACK packets with ECE set as a protection against dropped ACK packets until a suitable notification is received from the sender.

When the sender receives the ACK packet with ECE set, it knows that congestion was experienced on the network and behaves as if a packet had been dropped, which in the case of TCP is by halving the size of the congestion window. Depending on the variant of TCP being used, the size of the reduction can vary (a reduction of a half is common). The congestion window is defined as the number of segments that the sender can send before receiving an ACK. In effect, the larger the congestion window, the larger the number of data packets that can be outstanding at a given time. Conversely, a reduction in the size of the congestion window will reduce the number of data packets that can be outstanding and thus effectively reduce the number of data packets sent in a given time frame i.e. the transmission rate.

The sender thus acknowledges receipt of the ACK packet by marking the next data packet it sends with the ECT and congestion window reduced CWR 206 flags set. This ECT and CWR marked data packet is transmitted by the sender, and forwarded to the receiver. Once the receiver has received this data packet with CWR set, the receiving terminal stops marking ACK packets with the ECE flag. A data packet with the CE flag set that is received after a received data packet with CWR set is treated as a new instance of congestion.

Thus, it can be seen that by using the ECN enabled TCP protocol, it is possible for a router to notify the sender of congestion before packets need to be dropped, with the sender reacting by reducing the size of the congestion window. However, the problem of how to intelligently allocate bandwidth share across multiple data flows still arises, as all the flows (across the same portion of a congested network) will respond in a similar fashion even under ECN and thus each flow will still get a roughly equal share of the available bandwidth.

SUMMARY OF THE INVENTION

It is the aim of embodiments of the present invention to address one or more of the above-stated problems.

According to one aspect of the present invention, there is provided a method of operating a receiving terminal for controlling bandwidth share of a data flow in a network, said method comprising:
i) receiving a plurality of data packets forming part of a data flow sent by a sending terminal, wherein at least two of the plurality of data packets are marked with a first flag indicating congestion experienced at an intermediate node in the network;
ii) calculating the average rate at which the at least two data packets that are marked with a first flag are received;
iii) responding to each of the received plurality of data packets by transmitting a corresponding one of a plurality of acknowledgement packets to the sending terminal; and
iv) marking a plurality of the acknowledgement packets with a second flag, which when received by the sending terminal causes a reduction in the transmission rate of the data packets in the data flow, and wherein the rate at which the acknowledgement packets are marked with a second flag is a function of the average rate at which the received plurality data packets are marked with a first flag.

Preferably, the rate is a packet based arrival frequency. Alternatively, the rate is some time based rate such as a time based arrival interval or period.

Preferably, the function is a multiplier, n, applied to the average rate at which the received data packets are marked with a first flag. The resulting bandwidth share for the data flow may be dependent on the applied multiplier.

A limit on the marked acknowledgement packets may be set to equal the total number of data packets marked with a first flag multiplied by the applied multiplier.

The network may be an IP network, and the first flag may be a congestion experienced flag in an explicit congestion notification field in the IP header of the corresponding data packet. The second flag may be an explicit congestion notification echo flag. The reduction in transmission rate at the sending terminal maybe the effect of a TCP congestion window reduction at the sender.

In a second embodiment of the present invention, there is provided a receiving terminal for receiving a data flow, said receiving terminal comprising processing means adapted to:
receive a plurality of data packets forming part of a data flow sent by a sending terminal, wherein at least two of the plurality of data packets are marked with a first flag indicating congestion experienced at an intermediate node in the network;
calculate the average rate at which the at least two data packets that are marked with a first flag are received;
respond to each of the received plurality of data packets by transmitting a corresponding one of a plurality of acknowledgement packets to the sending terminal; and
marking a plurality of the acknowledgement packets with a second flag, which when received by the sending terminal causes a reduction in the transmission rate of the data packets in the data flow, and wherein the rate at which the acknowledgement packets are marked with a second flag is a function of the average rate at which the received plurality data packets are marked with a first flag.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In one proposed solution to the problem of controlling bandwidth share, the ECN protocol is modified in a manner that removes the one-to-one relationship between the network signalling congestion (CE) and the end-point response to that congestion (CWR). This allows a receiver terminal to exhibit some control of the bandwidth share it receives for a data flow relative to other receiver terminals. The underlying principle is to influence the ratio of bandwidth between 2 more flows over the same network segment. This is done by filtering the CE markings arriving at a receiver such that they do not result directly with the setting of the ECE flag in ACK packets sent back to the sender. In particular, the idea is to skip a specific number of CE markings such that fewer than normal ACKs with ECE flags set are sent back to the sender. Put another way, only some of the ACK packets that are sent back to the sender are marked with ECE flags indicating that a CE flagged packet has been received. This operation of not marking a number of the ACKs gives the receiver some control over the frequency of congestion window reduction events at the sender and thus exhibit some control on the transmission rate, and resulting bandwidth share allocation, from the sender.

Figure 1:
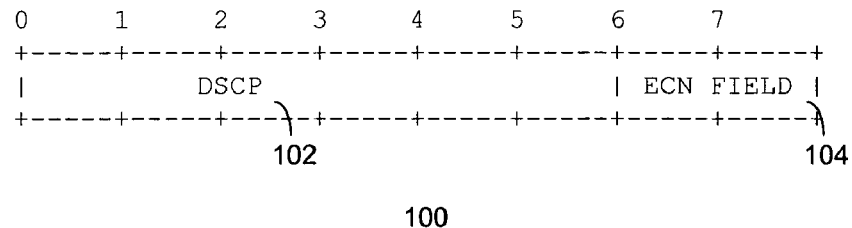
FIG. 1 shows the IPv4 Type Of Service (TOS) octet, including the 2 bits designated for ECN use.
Figure 2:
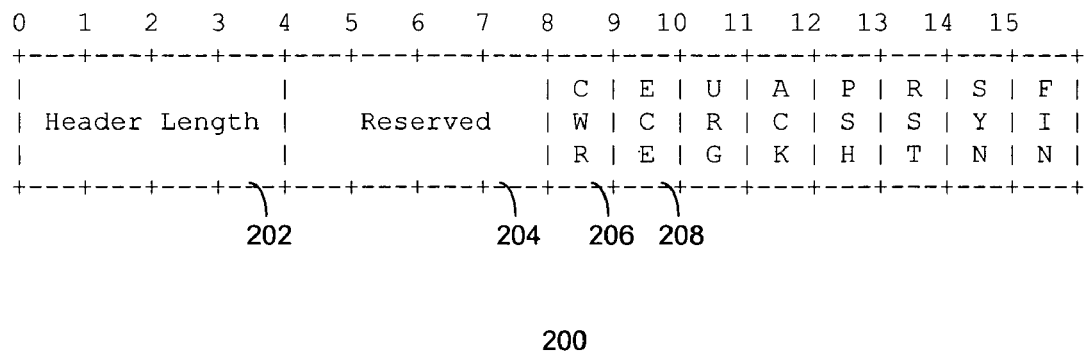
FIG. 2 shows bytes 13 and 14 of a TCP header, including the fields designated for the congestion window reduced flag and the ECN echo flag.
Figure 3:
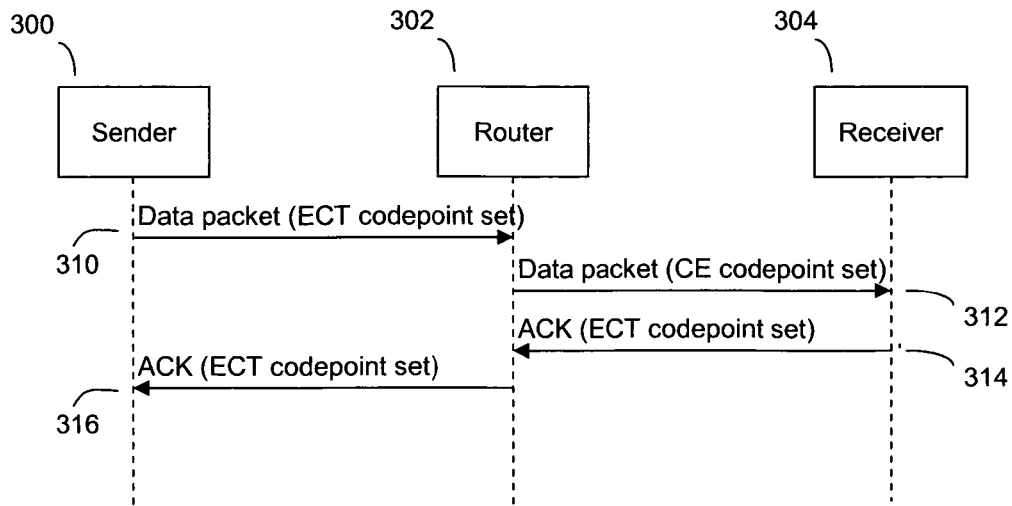
FIG. 3 shows a data flow between a sending terminal and a receiving terminal with ECN active, and with congestion experienced at the router in a proposed solution.

This "ECN skipping" solution is set out in FIG. 3 showing the message flow between a sending terminal 300 and a receiving terminal 304 via an intermediate router 302. In step 310, the sending terminal sends a data packet with the ECN codepoint set as "0 1" or "1 0" in the ECN field to signal an ECN capable transport. In this case, the router 302 is experiencing congestion and will thus mark any received data packets with a congestion experienced (CE) flag. Thus, in step 312, the data packet received by the router 302 is forwarded to the receiver 304 with the congestion experienced CE codepoint set by setting the ECN field to "1 1". Under normal ECN, the receiving terminal would respond to the receipt of a data packet marked with a CE flag by responding with an acknowledgement data packet with the ECN-Echo (ECE) flag set. However, in this proposal, the receiving terminal can choose to skip (effectively ignore) the CE marking on the incoming data packet by sending an acknowledgement packet ACK with only the ECT codepoint set instead, and without setting the ECE flag. This ECT marked data packet is transmitted by the receiving terminal 304 to the sending terminal 300 via the router 302 in steps 314 and 316.

When the sending terminal 300 receives the ACK packet, it continues as normal as the ACK did not include an ECE flag to instruct the sending terminal to reduce the congestion window size. Thus, the deliberate "skipping" of a received CE flag in a data packet by the receiving terminal ensures that the transmission rate used by the sending terminal is not reduced (and indeed will increase under TCP congestion avoidance protocols), even though the router is congested and is signalling accordingly. By controlling the skipping rate (e.g. skip 1 out of every 2 CEs, or 2 of 3), the receiving terminal can control the transmission rate of data packets. Furthermore, when there are other data flows in the same network, the relative bandwidths experienced by receiving terminals can be managed by adjusted relative skipping rates at those receiving terminals.

Figure 4:
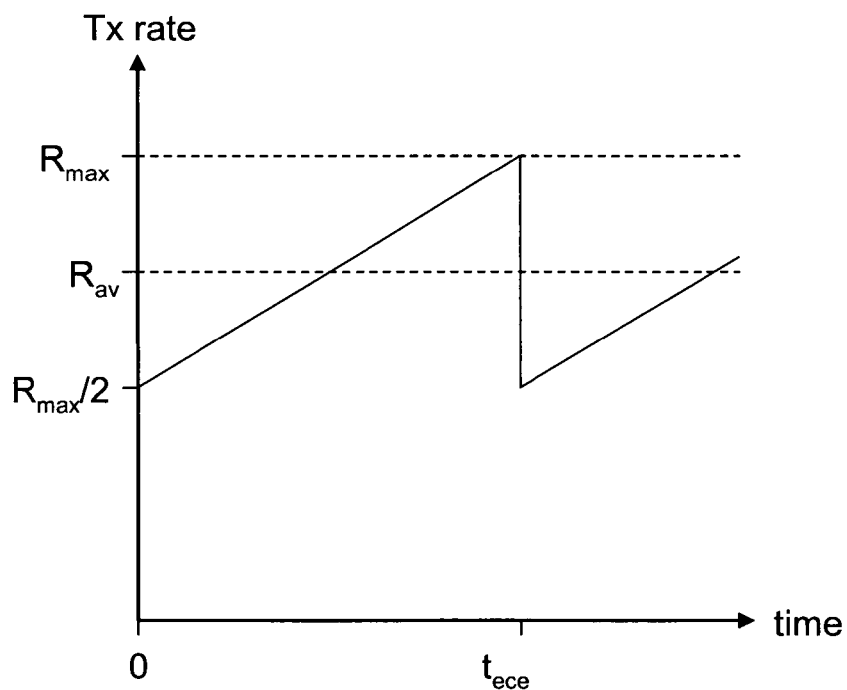
FIG. 4 shows how CE marked data packets are handled by the receiving terminal in a proposed solution.

Once a sender operating under TCP has passed the slow-start phase, it will respond to received data packets with the ECE flag set by halving its congestion window as it would if a packet had been lost. After this point, the congestion window is increased in a linear fashion until the next ECE marked packet or loss event. This is shown in FIG. 4, which plots a graph of the transmission rate after the slow start phase over time. Assuming that an increase in congestion window size is limited to once every round trip time (RTT) when it is increased by one segment size, then the instantaneous transmission rate can be modelled as shown below.

The maximum transmission rate $R_{max}$ can be expressed as:

$$R_{max} = \frac{R_{max}}{2} + \frac{t_{ece}}{RTT} \cdot \frac{S}{RTT} \quad (1)$$

where
$t_{ece}$ is the time an ECE marked packet arrives at the sender
RTT is the round trip time
S is the size of a packet The second term in equation (1) is the number of window increase occurrences, $t_{ece}/RTT$, multiplied by the magnitude of each rate increase, $S/RTT$. As the rate increase is linear it can be observed that the average transmission rate is:

$$R_{av} = \frac{3}{4} R_{max} \quad (2)$$

Substituting equation (2) into equation (1) we get:

$$R_{av} = \frac{1.5 \cdot t_{ece} S}{RTT^2} \quad (3)$$

The probability of an ECE marked packet being received, $P_{ece}$, will influence the average time between congestion window halving events. Thus $t_{ece}$ can be expressed as the product of the average packet transmission time and the average number of packets between ECEs:

$$t_{ece} = \frac{S}{R_{av}} \cdot \frac{1}{P_{ece}} \quad (4)$$

By substitution of equation (4) into equation (3), the following relationship can be determined:

$$R_{av} = \frac{1.22}{\sqrt{P_{ece}}} \cdot \frac{S}{RTT} \quad (5)$$

S and RTT are generally fixed, so equation (5) gives a direct relationship between the probability of ECEs and the average transmission rate.

Equation (5) can be used directly by a device, such as a router or a receiving terminal, to generate ECE marked packets at the appropriate rate to achieve a desired average transmission rate.

It has been found that this is particularly useful when considering the transmission ratio between 2 or more flows and how this relative ratio can be tuned by using the above described ECN skipping technique.

Figure 5:
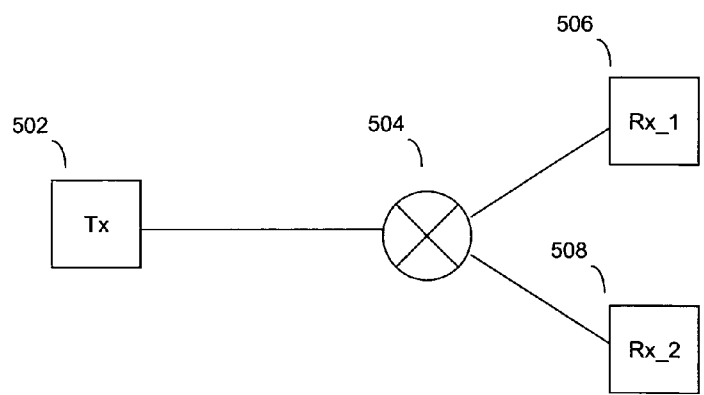
FIG. 5 shows a network having two receivers sharing the same segment of network over a router.

Now consider 2 receivers, Rx_1 506 and Rx_2 508, sharing the same network segment to a transmitter Tx 502 as shown in FIG. 5, and thus subject to the same congestion. If we assume that one receiver has a probability of sending ECE marked packets equal to the probability of receiving a CE marked packet and the second receiver has a probability of sending ECE marked packets reduced by skipping a number of CE marked packets as described above. As both flows share the same congested segment of network, then the probability of CE marked packets, $P_{ce}$, is the same for both flows. Thus, the probability of sending ECE marked packets in the first flow is:

$$P1_{ece} = P_{ce} \quad (6)$$

And the probability of sending ECE marked packets in the second flow is:

$$P2_{ece} = P_{ce}/(\text{skip}+1) \qquad (7)$$

Substituting equations (6) and (7) into equation (5) we get:

$$R1_{av} = \frac{1.22}{\sqrt{P_{ce}}} \cdot \frac{S}{RTT} \qquad (8)$$

$$R2_{av} = \frac{1.22}{\sqrt{P_{ce}/(\text{skip}+1)}} \cdot \frac{S}{RTT} \qquad (9)$$

Combining equations (8) and (9) we can calculate the ratio between the two average rates as:

$$\frac{R1_{av}}{R2_{av}} = \frac{1}{\sqrt{\text{skip}+1}} \qquad (10)$$

Figure 6:
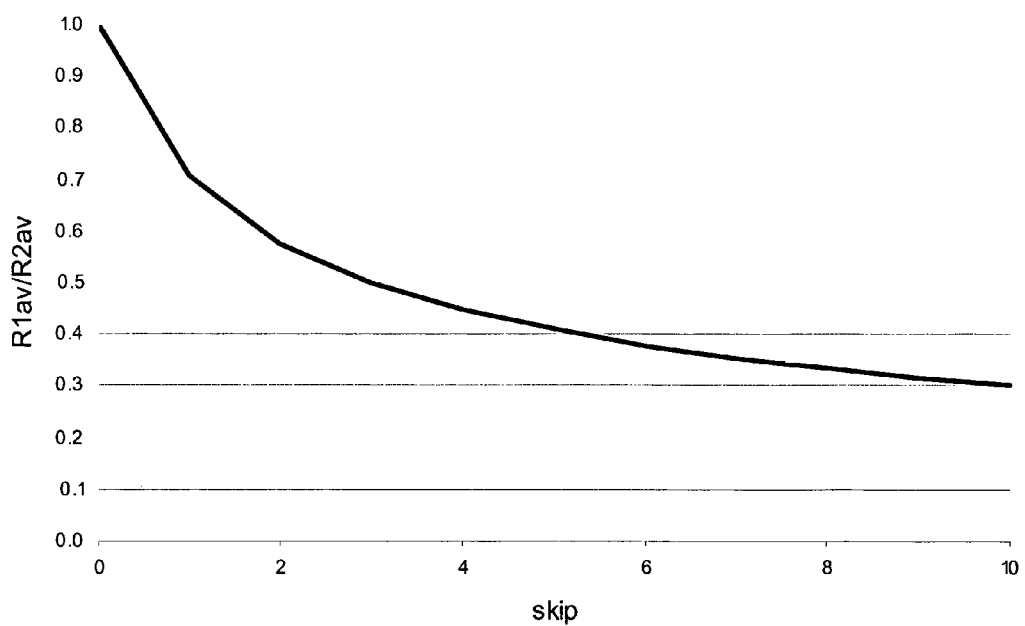
FIG. 6 is a graph showing the ratio of the transmission rates for two receivers, one without skipping and the other skipping at various rates.

Equation (9) is plotted in the graph in FIG. 6, which shows the ratio of the average transmission rates for the first (non-skipping) receiver and the second (skipping) receiver plotted against the skip rate applied by the second receiver. From FIG. 6, it can be seen that the transmission rate ratio can be influenced by around a third for skip intervals of up to 10.

Equation (10) shows the ratio between the average rates of two flows where one flow is skipping at a given rate and the other is not skipping. In the event that both flows are skipping, each at their own rate, then equation (11) gives the ratio where skip1 is the skip interval applied to flow 1 and skip2 is the skip interval applied to flow 2. It is envisaged that on a given network multiple flows would co-exist each skipping at their own given rate in order to achieve their desired bandwidth shares.

$$\frac{R1_{av}}{R2_{av}} = \frac{\sqrt{\text{skip1}+1}}{\sqrt{\text{skip2}+1}} \qquad (11)$$

The methods described above have been validated in simulations using a network simulator. All the simulation results show that the transmission rate ratio between 2 flows as the skip rate of the second flow varies is largely consistent with the theoretical results.

Whilst this scheme does produce some encouraging results, the bandwidth ratios achieved are limited to around 1:4 in practice (see FIG. 6), which is not sufficient for some of the more demanding applications. The desire for higher bandwidth ratios has been driven by a need to simultaneously support both SD and HD video services where bandwidth ratios are more likely in the 1:20 region. Furthermore, if too many receiving terminals try to utilise a high skipping interval, then the methods described above are likely to fail to signal impending congestion back to the sender, which would result in router queues to overflow (remember that the initial CE markings are made by a router experiencing congestion). The result is that normal TCP congestion control will take place with inevitable packet loss signalling congestion, and control of bandwidth share is lost.

In examples of the present invention, a scheme is proposed where whereby additional ECEs can be inserted by the receiving terminal giving rise to higher bandwidth ratios and better control of router queue levels thus preventing overflow and the onset of normal TCP behaviour.

In order to achieve larger bandwidth ratios, the router buffer fill level needs to be controlled such that buffer overflow is prevented. The concept of inserting additional ECE marked ACK packets in combination with skipping received CE marked packets is proposed. However, determining when to insert additional ECEs is difficult. When calculating when an additional ECE needs to be inserted, two CEs must have been received, so that the CE interval can be calculated, but ideally the additional ECE needs to be inserted before the second CE is actually received. CEs do not arrive at the same intervals, so simply using the previous interval to calculate the insertion point would have lead to complicated overlapping of CE intervals.

Figure 7:
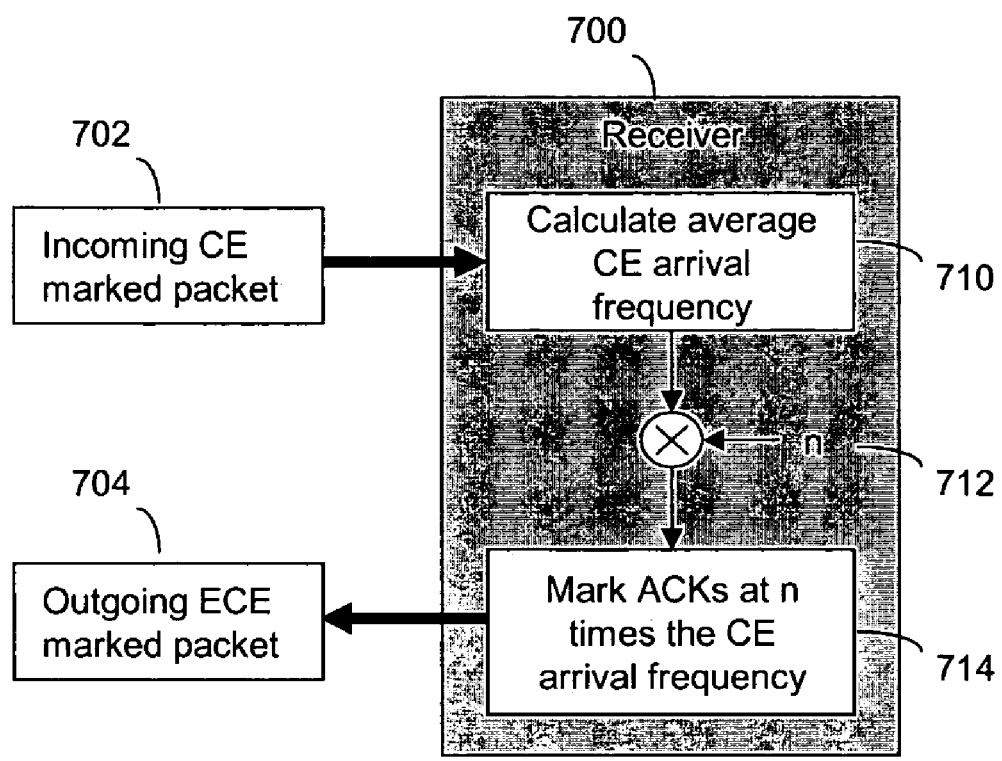
FIG. 7 shows a receiver implementing an example of the present invention.

To overcome these problems and achieve the goal of improved bandwidth share, a decoupled scheme is proposed in accordance with examples of the present invention, and is illustrated in FIG. 7.

In normal ECN operation, a receiver will generate ECE marked ACKs in direct response to an incoming packet marked with a CE. In an example of the proposed invention as shown in FIG. 7, the receiver 700 receives an incoming CE marked packet 702, and calculates 710 the average CE arrival frequency. Generation of ECEs is not directly linked to the incoming CEs, but controlled by a multiplier applied to the average CE arrival frequency. As shown in FIG. 7, a multiplier n 712 is applied to the average CE arrival frequency to get the frequency at which ACKs should be marked with ECEs in accordance with an example of the present invention. The effect of averaging the CE arrival frequency as well as applying the multiplier n is a decoupling of the ECE marked ACKs (i.e. not in direct response) sent by a receiver from the received CE marked packets.

A multiplier of n greater than 1 results in an increase in the ECE marking frequency i.e. additional ECEs are inserted in response to received packets. A multiplier of n less than 1 decreases the ECE marking frequency i.e. some received CE marked packets are not responded to with ECE marked packets. By carefully controlling the value of n used across multiple receivers, it is possible to both control the bandwidth share at each of those receivers as well as ensure that router buffer levels are maintained at sensible levels without overflow. Put into more general terms, the effect of applying the multiplier in this manner is to make the frequency of the ECE markings a function of the average CE arrival frequency, but where preferably the function is a multiplier applied to the average CE arrival frequency.

As described in the earlier proposal of ECN skipping above, the throughput levels achieved under TCP can be modelled using equation (5):

$$R_{av} = \frac{1.22}{\sqrt{P_{ece}}} \cdot \frac{S}{RTT}$$

where
$R_{av}$ is the average transmission rate;
$P_{ece}$ is the probability of an ECE marked packet arriving at the sender which under normal ECN operation is effectively equivalent to the probability of a CE arriving at the receiver $P_{ce}$;
S is the size of the segment or packet; and
RTT is the round trip time.

Now consider the case where there are 2 flows from a sender to 2 different receivers, where the flows share the same segment of network over a common router. The probability of a CE marked packet arriving at the second receiver, $P2_{ce}$, will be the same as the probability of a CE marked packet arriving at the first receiver, $P1_{ce}$ or $P_{ce}$ as referenced above.

Thus, the probability of an ECE arriving at the sender from the first flow is given by:

$$P1_{ece} = P_{ce} \quad (12)$$

And the probability of an ECE arriving at the sender from the second flow, that is applying a frequency multiplier n, is given by:

$$P2_{ece} = nP_{ce} \quad (13)$$

By substituting equation (12) and (13) into (5), we get:

$$R1_{av} = \frac{1.22}{\sqrt{P_{ce}}} \cdot \frac{S}{RTT} \text{ and} \quad (14)$$

$$R2_{av} = \frac{1.22}{\sqrt{nP_{ce}}} \cdot \frac{S}{RTT} \quad (15)$$

respectively.

Equation (14) and (15) can be combined to give the rate ratio relationship:

$$\frac{R1_{av}}{R2_{av}} = \sqrt{n} \quad (16)$$

Equation (16) gives the transmission rate ratio between 2 flows when the second flow is applying a CE frequency multiplier of n. The table below gives some values of n, the corresponding rate ratios (R1/R2), and the equivalence to skipping CEs and inserting additional ECEs.

| N | Rate ratio (R1/R2) | Equivalent to . . . |
|---|---|---|
| 0.015625 | 0.125 (1/8) | Skipping 63 |
| 0.0625 | 0.25 (1/4) | Skipping 15 |
| 0.25 | 0.5 (1/2) | Skipping 3 |
| 1 | 1 | Neutral |
| 4 | 2 | Inserting 3 |
| 16 | 4 | Inserting 15 |
| 64 | 8 | Inserting 63 |

Equation (16) shows the ratio between the average rates of two flows where one flow is applying a CE frequency multiplier n and the other is not. In the event that both flows are applying their own CE frequency multiplier, then equation (17) gives the ratio where n1 is the CE frequency multiplier applied to flow 1 and n2 is the CE frequency multiplier applied to flow 2. It is envisaged that on a given network multiple flows would co-exist, each applying their own CE frequency multipliers in order to achieve their desired bandwidth shares.

$$\frac{R1_{av}}{R2_{av}} = \frac{\sqrt{n2}}{\sqrt{n1}} \quad (17)$$

This scheme allows the frequency of ECE generation to be either higher or lower than the incoming CE frequency. The previously presented skipping only scheme has practical limits when the amount of CE skipping causes router buffers to overflow. By carefully controlling the multipliers used, router buffers can be maintained at the same level as without any manipulation, and thus router buffer overflow can be prevented and the achievable rate ratios increases.

As described, as well as deciding what value the multiplier n should take and applying that to the incoming average CE frequency, the incoming average CE frequency itself must be determined. In the present example, the incoming average CE frequency is defined as the reciprocal of the average packet interval between received CE marked packets. The average interval is calculated over several consecutive CE arrival intervals and is measured as a packet count. For example, if a CE marked packet is received after 3 non-CE marked packets, then the CE arrival interval is 4, and the CE arrival frequency is 0.25. If the next CE marked packet arrives after a further 5 non-CE marked packet, then the second CE arrival interval is 6, but the average CE arrival interval will be 5, giving an average CE arrival frequency of 0.2.

There are various approaches for determining the number of CE arrival intervals over which the average should be taken. Too few intervals and the approach would be susceptible to short term fluctuations, too many intervals and the approach would be too slow to respond to changes in the level of congestion. In order to determine the most appropriate number of CE arrival intervals over which to average, a number of simulations were run using this proposed decoupled scheme with a frequency multiplier n of 1, and comparisons made when the same simulation was run with normal non-decoupled ECN behaviour. The following metrics were used in the comparison between the normal non-decoupled behaviour and the proposed decoupled scheme:

Average router queue—The number of packets in the router queue sampled every second and averaged over the duration of the simulation Standard deviation of router queue—The standard deviation of the previous average. Gives an indication of how much the queue levels vary about the average.

Frequency response of the receiver rate—Sampling the receiver rate regularly and transforming to a frequency response gives a more detailed view of how the receiver rate varies about the average. The previous metric gives the magnitude of variations but it doesn't give any indication of the characteristic of the variations. This metric will reveal when variations are slow or erratic and fast.

Using these metrics, the best match between the decoupled and non-decoupled scheme was achieved when averaging was performed over around 3 CE arrival intervals.

Whist controlling the frequency at which ECE marked packets are sent is fundamental to this present solution, the total number of ECEs sent must also be controlled. This is because when the sender performs a congestion response as a result of receiving an ECE, fewer packets are sent and thus the router queue reduces, which means that CE generation will become less frequent. Left unconstrained, the receiver would continue to generate. ECEs at n times the average incoming CE frequency, yet the average might not be updated immediately due to the now longer interval between CEs being received. However, ECEs would continue to be generated, exacerbating the problem as they cause further congestion responses at the sender and further reductions in the router queue. Eventually no further CEs will be generated, and the average doesn't get updated, so the mechanism collapses resulting in extremely poor network utilisation. Therefore, we constrain the number of ECEs sent to n times the number of received CEs.

Figure 9:
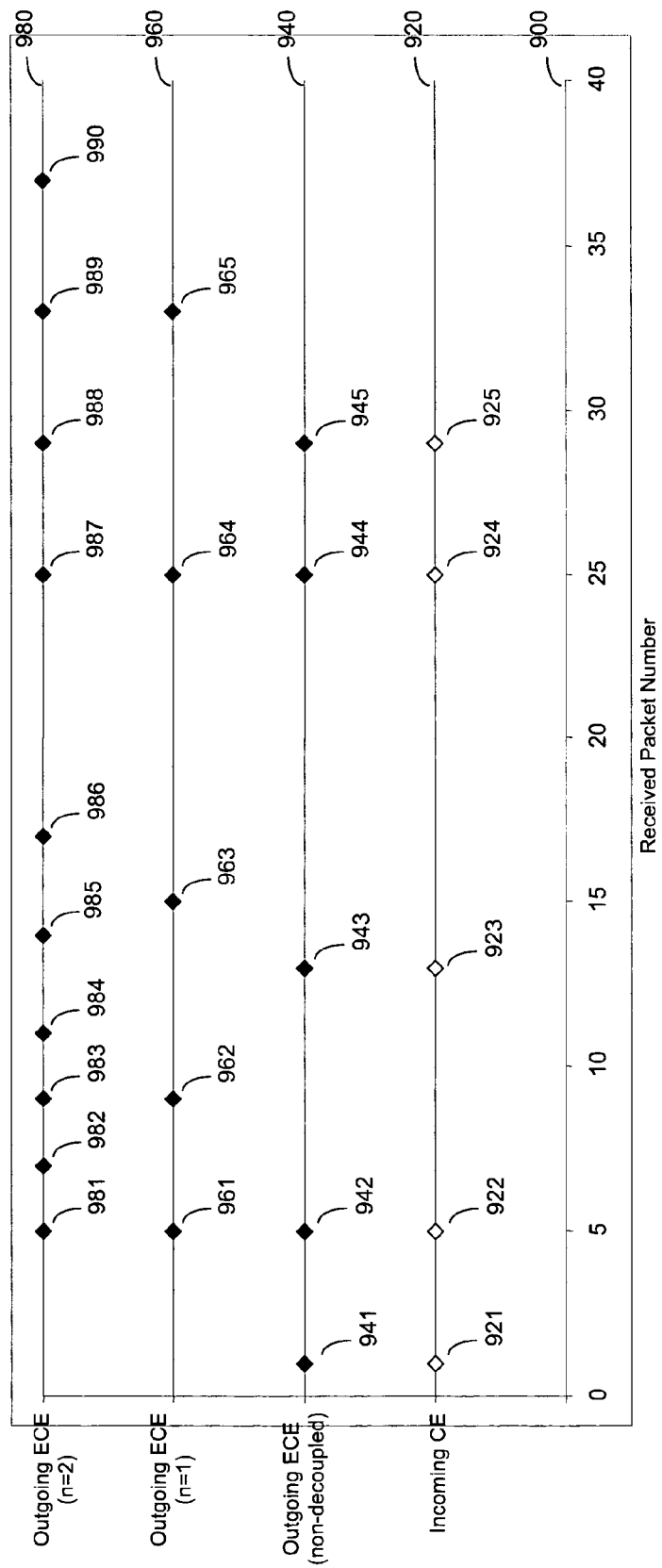
FIG. 9 is graph illustrating the generation of ECEs in response to received CEs for a normal scenario, as two further scenarios according to the methods of the invention.

The plots in FIG. 9 show how ECEs are sent by a receiver 304 in response to packets received from a sender 300 that had been marked en-route with a CE flag by an intermediate router 302 using the above proposed scheme, and also includes a reference condition plot. The x-axis 900 shows a count of the received data packets for a given flow. This count is of all data packets received by the receiver 304, irrespective of whether they are marked with CEs are not. When a received data packet is marked with a CE, it is shown as a point on the plot 920 at the relevant packet position. For example, plot 920 shows the incoming CE marked packets for a flow, with the first CE marked packet 921 received as packet number 1, the second CE marked packet 922 received as packet number 5, the third at packet number 13, and so on. It is implicit that the receiver receives all the non-CE marked data packets (packet 2, 3, 4, 6, 7, etc), but as these are not marked with CEs, they are not marked on plot 920, but represented only by the count on the x-axis 900.

Plot 940 shows all outgoing ECEs sent by the receiver in a reference condition under normal ECN operation, where ECEs are sent immediately in response to the received CEs shown in plot 920. For example, it is shown that an ECE marked ACK 941 is sent immediately in response to the first received CE marked packet 921. Similarly, ECE 942 is sent immediately in response to the second CE 922, and so on.

Plot 960 shows the outgoing ECE marked ACKs sent by a receiver in an example of the present invention, where the frequency multiplier n=1. Whilst no additional ECEs are added as a result of setting n=1 compared to the reference case, the plot 940 illustrates how the frequency at which the outgoing ECEs are sent varies as a result of the changing average CE arrival frequency (calculated from plot 920).

For example, in plot 960, the first ECE marked ACK 961 is sent after the second CE marked packet 922 is received at packet number 5. As the first CE marked packet was received as the $1^{st}$ data packet, and the second CE marked packet the $5^{th}$ data packet, the CE arrival interval is 4. Thus, the average CE arrival frequency is ¼=0.25. The ECEs must therefore be sent at a frequency of n*0.25=1*0.25=0.25. So, as the first ECE marked ACK 961 was sent in response to the $5^{th}$ data packet, the next ECE marked ACK is sent in response to the $9^{th}$ data packet to achieve an ECE sending frequency of 0.25.

As the multiplier n is equal to 1, the number of sent ECEs is already equal to the ECE limit, which is the number of CEs received. Thus, no further ECEs are sent at the ECE sending frequency until the next CE is received.

Now, the next CE marked packet 923 is received as data packet number 13. The average CE arrival interval is also calculated when the CE 923 is received, being 8. The average CE arrival interval is calculated as (4+8)/2=6. And thus the average CE arrival frequency is ⅙. So, the next ECE 963 is not sent until the $15^{th}$ data packet is received. Again, after this ECE marked ACK 963 is sent, the next that would have been sent would be in response to data packet 21, however, the ECE limit has been reached, and thus nothing is sent until we get received the next CE packet 924.

CE marked data packet 924 is received as data packet number 25. The average CE arrival interval is now (4+8+12)/3=6. Thus the average CE arrival frequency is now ⅙, which means that the next ECE marked ACK could have been sent in response to data packet 21 (6 packets after the previous ECE 963). However, this opportunity has passed, so instead an ECE marked ACK 964 is sent immediately in response to the CE 924.

Similar processing takes place for subsequent received CEs, with ECEs sent in accordance with the proposed method based on adjusted averaged CE arrival frequency.

A skilled person will realise that more actual ECE marked ACKs might be sent over those shown in the plots in FIG. 9. This is because in practice, an ECE marked ACK is sent in response to the received CE packet followed by further ECE marked ACKs, one for every received data packet of any type, up until a congestion acknowledgement is received from the sender. The congestion acknowledgement would typically be a data packet marked with a CWR (congestion window reduction) flag. However, for simplicity and clarity, only the sending of the initial ECE in response to a received CE is shown.

Figure 8:
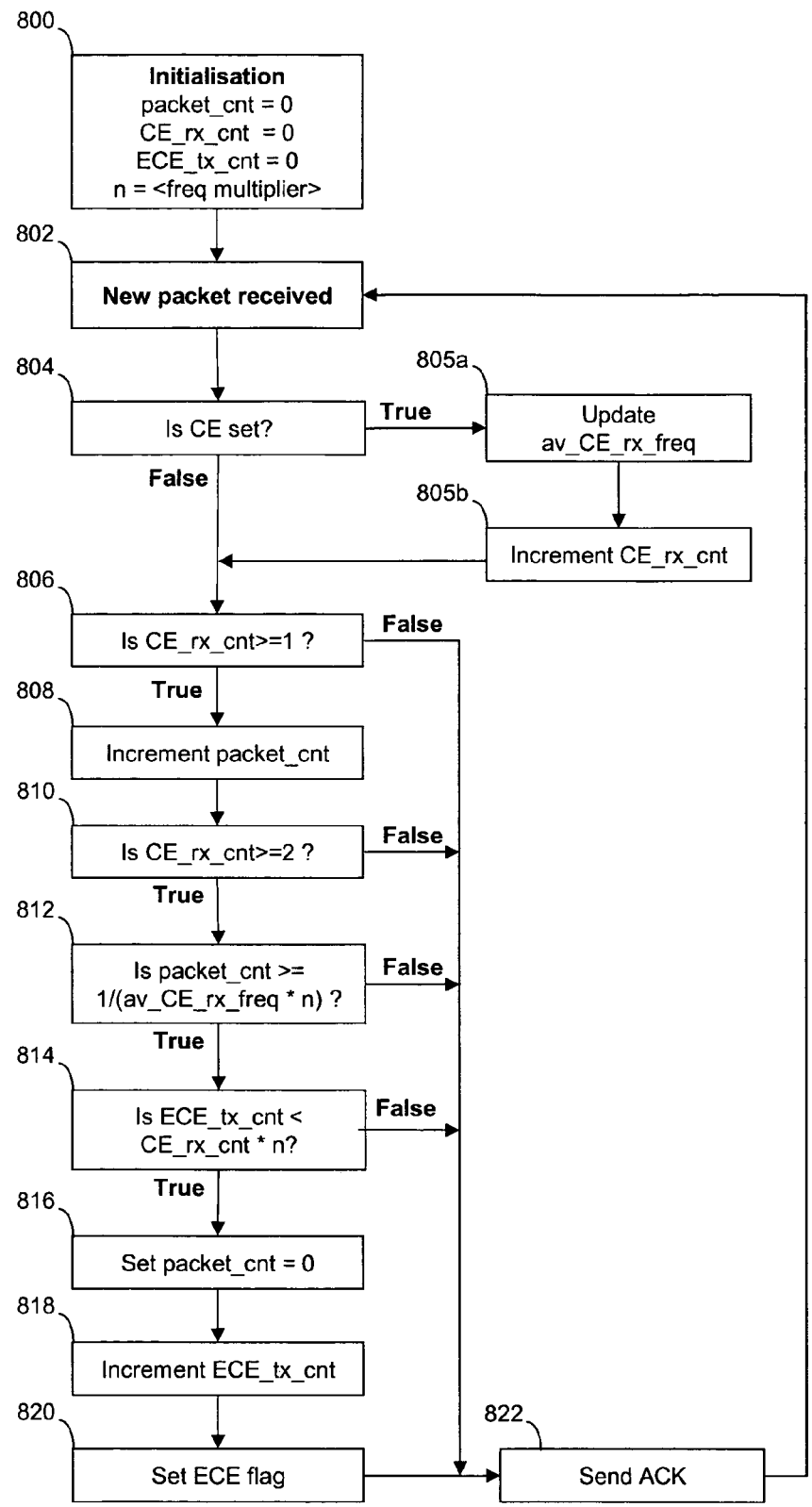
FIG. 8 is a flow chart showing the operation of an example of the present invention at a receiver.

The steps of one method of operating the proposed invention at a receiving terminal 304 are shown in the flow chart in FIG. 8. The steps of the flow chart in FIG. 8 will be described with reference to the data shown in plot 920 and 980 shown in FIG. 9, where the receiver 304 is arranged to apply a multiplier of n=2 to the average CE arrival frequency.

In step 800, the following variables are initialised: packet_cnt, which is a count of the number of data packets received since an ACK was last sent carrying an ECE flag; CE_rx_cnt, which is a counter of the number of CE marked packets received; ECE_tx_cnt, which is a counter of the number of ECE marked ACK packets sent; and n, which is the frequency multiplier for this flow. In this example, the frequency multiplier n is set to 2.

In step 802, a new packet is received. Referring to plot 920 in FIG. 9, this is the data packet number 1, which is a CE marked packet 921. Thus, in step 804, the result of the check on whether the CE flag has been set is true, and processing passes to step 805a, where the av_CE_rx_freq is updated. However, at this stage, only one CE marked packet has been received, and so the av_CE_rx_freq is set to 0. Then in step 805b, the CE_rx_cnt is incremented (initialised to 0 in step 800) to 1.

In step 806, a check is made to see if CE_rx_cnt is >=1. Here, the CE_rx_cnt=1, so the result of step 806 is true and processing passes to step 808. Step 806 is in place to handle the initial portions of a flow where non-CE data packets are first received. Thus, if the first (and any subsequent) data packets are not marked with a CE flag, then the CE_rx_cnt would remain at 0, and thus the result of the test in step 806 would be false, and processing pass to step 822, where an ACK is sent, without any prior setting of any ECE flag.

Now, returning to step 808, the packet_cnt is incremented by 1, before passing on to step 810. In step 810, a check is made to see if the CE_rx_cnt is >=2, which effectively tests for whether a second CE marked packet has been received yet. In this case, the result of the check is false, as CE_rx_cnt=1, and processing passes to step 822 where an ACK is sent.

After the ACK is sent in step 822, processing returns to step 802, where the next packet is received. In this example, the next data packet, number 2, is not marked with a CE flag. Thus, the check in step 804 returns false, and processing passes directly to step 806. At this stage, the CE_rx_cnt is still at 1 (set in the earlier loop when processing CE marked packet 921), so the check in step 806 is true, so processing passes on to step 808, where the packet_cnt is incremented, before passing onto step 810. Here the test to see if the CE_rx_cn>=2 returns false, and so processing passes to step 822 where in an ACK is sent.

The next data packet, packet number 3, is now received and processed starting at step 802. The processing for the next data packet, packet number 3, is the same as that for packet number 2 as it is not a CE marked packet. The result of the processing of packet number 3 is the incrementing of the packet_cnt in step 808, and the sending of an ACK in step 822. The processing for the next data packet received, packet number 4, is also the same as that for packet number 2 as it also is not marked with a CE flag. After packet number 4 has been processed and the associated ACK been sent, the state of the variables is as follows: packet_cnt=4, CE_rx_cnt=1, ECE_tx_cnt=0 and av_CE_rx_freq=0.

The next packet received is packet number 5, which is a CE marked packet 922. Therefore, at step 804, the test on whether the CE flag is set returns true, and processing moves to step 805a. In step 805a, the av_CE_rx_freq is updated. Here the CE interval is 4 data packets. There are no other CE intervals to average over, so the average CE interval can also be considered to be 4 data packets. Thus, the av_CE_rx_freq=¼. In step 805b, the CE_rx_cnt is incremented (now equal to 2).

In step 806, the check to see if the CE_rx_cnt is >=1 is true, and so in step 808, the packet_cnt is incremented (now equal to 5). In step 810, a check is made to see if the CE_rx_cnt is >=2, which it now is, so processing continues on to step 812. In step 812, a check is made to see if sufficient number of data packets have been received for an ECE to be sent at the calculated frequency. Thus, step 812 tests to see if packet_cnt is >=1/(av_CE_rx_freq*n). Well, packet_cnt=5, and the right hand side of the equation is 1(¼*2)=2. Thus, the check in step 812 is true, and processing passes to step 814.

In step 814, an ECE limit check is made by checking to see if the ECE_tx_cnt is <CE_rx_cnt*n. In this case, ECE_tx_cnt=0, and the CE_rx_cnt*n=4, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs until the reset, for example after receipt of a CWR marked data packet. In step 822, an ACK is sent, which will now have an ECE flag set as a result of step 820. This ECE marked ACK is shown as packet 981 in FIG. 9. Now processing returns to step 802, where the next packet is received.

The next packet received is a data packet number 6, and is not marked with a CE flag. The processing for this data packet passes through steps 804, 806, 808, 810 and 812. At step 812, the check to see if the packet_cnt (currently=1) returns false as the right hand side of the test=1/(¼*2)=2. Thus, the next step is step 822, where an ACK is sent but without any prior setting of an ECE flag.

The next data packet received is packet number 7, which is also not marked with a CE flag. Processing of this packet passes through steps 804, 806, 808, 810 and 812. At step 812, the check to see if the packet_cnt (currently=2) returns true, as the right hand side of the test=1/(¼*2)=2. Thus, the next step is step 814. At step 814, the ECE limit check is done by checking to see if the ECE_tx_cnt is <CE_rx_cnt*n. In this case, ECE_tx_cnt=1, and the CE_rx_cnt*n=4, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 982 in FIG. 9.

The next data packet received is packet number 8, which is not marked with a CE flag and follows the same processing steps as for packet number 6. The result is an ACK being sent in step 822 without the prior setting of an ECE flag.

The next data packet received is data packet number 9, which is not marked with a CE flag. Processing of this packet passes through steps 804, 806, 808, 810 and 812. At step 812, the check to see if the packet_cnt (currently=2) returns true, as the right hand side of the test=1/(¼*2)=2. Thus, the next step is step 814. At step 814, the ECE limit check is done by checking to see if the ECE_tx_cnt is <CE_rx_cnt*n. In this case, ECE_tx_cnt=2, and the CE_rx_cnt*n=4, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 983 in FIG. 9.

The next data packet received is packet number 10, which is not marked with a CE flag and follows the same processing steps as for packet number 8. The result is an ACK being sent in step 822 without the prior setting of an ECE flag.

The next data packet received is data packet number 11, which is not marked with a CE flag. Processing of this packet passes through steps 804, 806, 808, 810 and 812. At step 812, the check to see if the packet_cnt (currently=2) returns true, as the right hand side of the test=1/(¼*2)=2. Thus, the next step is step 814. At step 814, the ECE limit check is done by checking to see if the ECE_tx_cnt is <CE_rx_cnt*n. In this case, ECE_tx_cnt=3, and the CE_rx_cnt*n=4, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 984 in FIG. 9.

The next data packet received is packet number 12, which is not marked with a CE flag and follows the same processing steps as for packet number 10. The result is an ACK being sent in step 822 without the prior setting of an ECE flag.

The next data packet received is packet number 13, which is marked with a CE flag as shown in FIG. 9 as CE packet 923. Processing thus passes from step 804 to step 805a, where the average CE arrival interval is calculated=(4+8)/2=6. Thus, the av_CE_rx_freq is ⅙. In step 805b, the CE_rx_cnt is incremented (now=3). Processing then passes through steps 806, 808, 810 and onto 812. In step 812, a check to see if the packet_cnt (currently=2) returns false, as the right hand side of the test=1/(⅙*2)=3. Thus, the next step is step 822, where an ACK is sent without the prior setting of an ECE flag.

The next data packet received is data packet number 14, and is not marked with a CE flag. The processing for this data packet passes through steps 804, 806, 808, 810 and 812. At step 812, the check to see if the packet_cnt (currently=3) returns true as the right hand side of the test=1/(⅙*2)=3. Thus, the next step is step 814. At step 814, the ECE limit check is done by checking to see if the ECE_tx_cnt is <CE_rx_cnt*n. In this case, ECE_tx_cnt=4, and the CE_rx_cnt*n=6, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 985 in FIG. 9.

The next packet received is a data packet number 15, which is not marked with a CE flag. The processing for this data packet passes through steps 804, 806, 808, 810 and 812. At step 812, the check to see if the packet_cnt (currently=1) returns false as the right hand side of the test=1/(⅙*2)=3. Thus, the next step is step 822, where an ACK is sent but without any prior setting of an ECE flag.

The next data packet, packet number 16, is handled the same as packet number 16, with step 812 also returning false as the packet_cnt is =2. Thus, processing of this packet finishes at step 822 with the sending of an ACK without any prior setting of an ECE flag.

The next data packet received is packet number 17, which also not marked with a CE flag. The processing for this data packet passes through steps 804, 806, 808, 810 and 812. At step 812, the check to see if the packet_cnt (currently=3) returns true as the right hand side of the test=1/(⅙*2)=3. Thus, the next step is step 814. At step 814, the ECE limit check is done by checking to see if the ECE_tx_cnt is <CE_rx_cnt*n. In this case, ECE_tx_cnt=5, and the CE_rx_cnt*n=6, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 986 in FIG. 9.

By working through the flow chart steps of FIG. 8 with the subsequent data packets until the 25$^{th}$ data packet, it can be shown that no more ECE flags are set (i.e. step 820 is never reached) for the ACKs being sent by the receiver. Whilst there are a couple of opportunities to mark with an ECE flag based on the adjusted CE frequency, the ECE limit was effectively reached after sending of the ECE marked ACK 986, at least until the next CE packet is received.

So, the next packet received is data packet number 25, which is marked with a CE flag. This is shown as CE marked packet 924 in FIG. 9. Processing thus passes from step 804 to step 805a, where the average CE arrival interval is calculated=(4+8+12)/3=8. Thus, the av_CE_rx_freq is ⅛. In step 805b, the CE_rx_cnt is incremented (now=4). Processing then passes through steps 806, 808, 810 and onto 812. At step 812, the check to see if the packet_cnt (currently=8) returns true as the right hand side of the test=1/(⅛*2)=4. Thus, the next step is step 814. At step 814, the ECE limit check is done by checking to see if the ECE_tx_cnt is <CE_rx_cnt*n. In this case, ECE_tx_cnt=6, and the CE_rx_cnt*n=8, so the check is true and processing continues to step 816. In step 816, the packet_cnt is reset to 0, and then in step 818, the ECE_tx_cnt is incremented.

In step 820, the ECE flag is set, which enables setting of the ECE flag in subsequently sent ACKs. In step 822, an ACK is sent, which has an ECE flag set as a result of step 820. This ECE marked ACK is shown as packet 987 in FIG. 9.

It can be shown that working through the method as set out in the flow chart of FIG. 8 when applied to the remaining data packets in plot 920, will result in plot 980.

The above discussion of the flow chart only describes the setting of an ECE flag (step 820). However, it should be appreciated that the ECE flag will be reset when a congestion acknowledgement is received by the receiver i.e. receipt of a CWR (congestion window reduction) flagged data packet. Thus, step 820 is intended to indicate that all subsequently sent ACKs will be marked with an ECE flag until a CWR marked data packet (or similar event) is received, at which point the ECE flag is reset. For simplicity, this has not been included as a step in the flow chart of FIG. 8, but described here instead.

Whilst the above examples have referred to using the average CE arrival frequency measured as a function of packet count, it should be appreciated that other measures of the incoming CE rate could be used instead, such as the CE arrival interval measured as a function of time. The underlying principal of operation of the invention would remain unchanged, in the sense that the outgoing ECEs are sent at a rate that is a multiplier of the incoming CE rate. The measure of the rate chosen in the examples is a packet based arrival frequency, but a time based arrival interval or period between CE marked data packets could be used instead.

Figure 10:
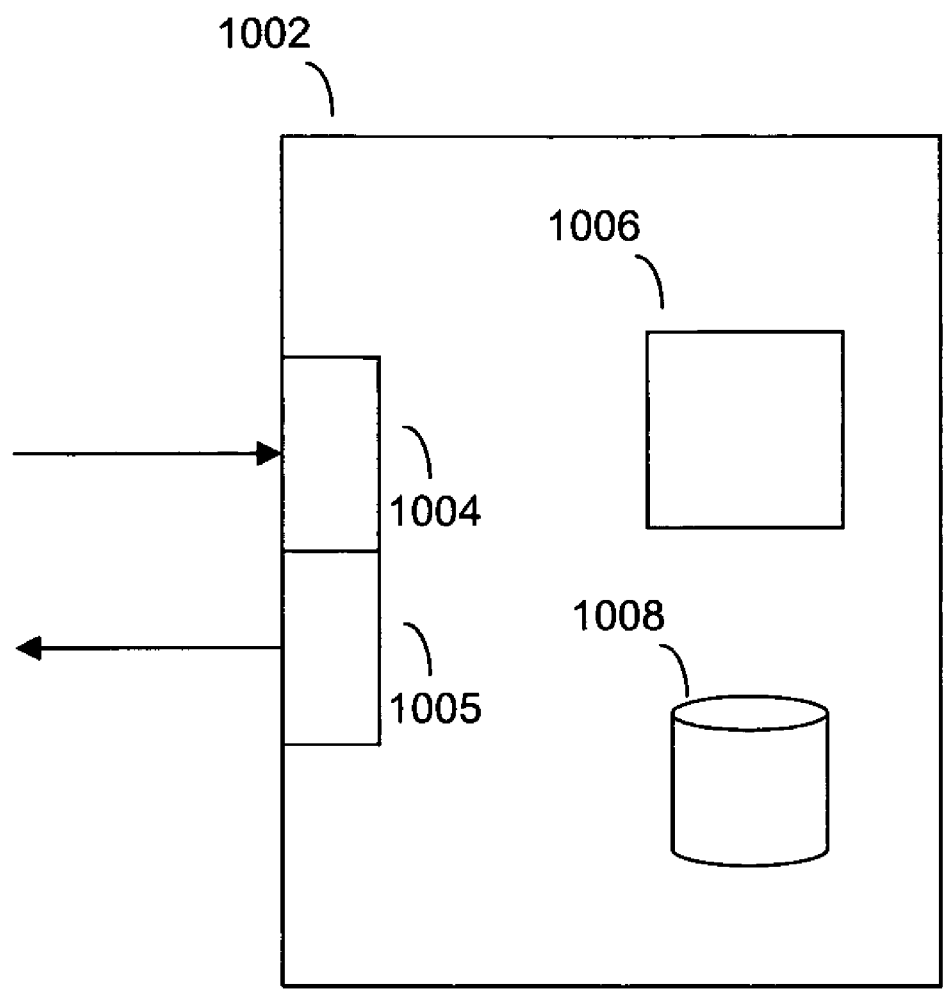
FIG. 10 is a block diagram illustrating some of the components in a receiver in an example of the invention.

FIG. 10 illustrates an example of the receiving terminal 1002 as described above. The receiving terminal 1002 comprises an input port 1004 for receiving data, and an output port 1005 for transmitting data. The input and output ports, as well as the data transmitted and received by the ports, are controlled by the CPU processor 1006. Memory 1008, which can take the form of RAM, a hard disk or other suitable storage media, stores application program data. Exemplary embodiments of the invention are realised, at least in part, by executable computer program code which may be embodied in the application program data. When such computer program code is loaded into the memory of the CPU 1006 for execution, it provides a computer program code structure which is capable of performing at least part of the methods in accordance with the above described exemplary embodiments of the invention.

Furthermore, a person skilled in the art will appreciate that the computer program structure referred can correspond to the process flow chart shown in FIG. 8, where each step of the flow chart can correspond to at least one line of computer program code and that such, in combination with the CPU in the receiving terminal, provides apparatus for effecting the described process.

It should be noted that whilst the implementation described here is largely receiver based, the invention is not limited to implementations only at a receiver. The basis of the invention is to decouple the relationship between the networking signalling of congestion and the transport layer response to those signals to enable bandwidth to be apportioned in non-equal amounts. In the example described above, the receiver filters network congestion information by adding additional ECE markings to sent ACK packets or skips CE events. However, a skilled person will appreciate that the skipping of congestion events could take place at an intermediate node such as a hub or router, or indeed even at the sender.

In addition this idea is not limited to implementations utilising TCP. Other transport layer protocols such as UDP could be used, although being connectionless it does not have any intrinsic congestion control. However, combining with higher layer application layer protocols such as RTP/RTCP could provide such a mechanism. In this case congestion information signalled from the network would propagate up from the IP layer to the application layer where it could be filtered before signalling to the sender (via RTCP) where a congestion response is invoked. There are many different possible responses to congestion but generally some reduction in the transmission rate is required.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:
1. A method of operating a receiving terminal for controlling bandwidth share of a data flow in a network, said method comprising:
   i) receiving a plurality of data packets forming part of a data flow sent by a sending terminal, wherein at least two of the plurality of data packets are 'marked with a first flag indicating congestion experienced at an intermediate node in the network;
   ii) calculating the average rate at which the at least two data packets that are marked with a first flag are received;

iii) responding to each of the received plurality of data packets by transmitting a corresponding one of a plurality of acknowledgement packets to the sending terminal; and iv) marking a plurality of the acknowledgement packets with a second flag, which when received by the sending terminal causes a reduction in the transmission rate of the data packets in the data flow, and wherein the rate at which the acknowledgement packets are marked with a second flag is a function of the average rate at which the received plurality data packets are marked with a first flag.

2. A method as claimed in claim 1, wherein the rate is a packet based arrival frequency.

3. A method as claimed in claim 1, wherein the rate is a time based arrival interval.

4. A method as claimed in claim 1, wherein the function is a multiplier applied to the average rate at which the received data packets are marked with a first flag.

5. A method as claimed in claim 4, wherein the bandwidth share for the data flow is dependent on the applied multiplier.

6. A method according to claim 4, wherein the total number of marked acknowledgement packets is not greater than the total number of data packets marked with a first flag multiplied by the applied multiplier.

7. A method as claimed in claim 1, wherein network is an IP network, and the first flag is a congestion experienced flag in an explicit congestion notification field in the IP header of the corresponding data packet.

8. A method according to claim 7, wherein the second flag is an explicit congestion notification echo flag.

9. A method according to claim 7, wherein the reduction in transmission rate at the sending terminal is as a result of a TCP congestion window reduction.

10. A receiving terminal for receiving a data flow, said receiving terminal comprising processing means adapted to:

receive a plurality of data packets forming part of a data flow sent by a sending terminal, wherein at least two of the plurality of data packets are marked with a first flag indicating congestion experienced at an intermediate node in the network;

calculate the average rate at which the at least two data packets that are marked with a first flag are received;

respond to each of the received plurality of data packets by transmitting a corresponding one of a plurality of acknowledgement packets to the sending terminal; and marking a plurality of the acknowledgement packets with a second flag, which when received by the sending terminal causes a reduction in the transmission rate of the data packets in the data flow, and wherein the rate at which the acknowledgement packets are marked with a second flag is a function of the average rate at which the received plurality data packets are marked with a first flag.

* * * * *